United States Patent
Kim et al.

(10) Patent No.: US 7,149,260 B2
(45) Date of Patent: Dec. 12, 2006

(54) CARRIER RECOVERY APPARATUS OF VSB RECEIVER AND A METHOD OF RECOVERING CARRIER USING THE SAME

(75) Inventors: Joon-soo Kim, Seoul (KR); Ki-bum Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 741 days.

(21) Appl. No.: 10/349,069

(22) Filed: Jan. 23, 2003

(65) Prior Publication Data

US 2003/0142760 A1    Jul. 31, 2003

(30) Foreign Application Priority Data

Jan. 29, 2002    (KR)    ................. 2002-5234

(51) Int. Cl.
*H03D 1/24*    (2006.01)
(52) U.S. Cl. .................. 375/321; 375/326; 375/327
(58) Field of Classification Search ................ 375/270, 375/321, 326, 327, 343, 355; 329/357; 455/47
See application file for complete search history.

(56) References Cited

U.S. PATENT DOCUMENTS 6,396,550 B1 *  5/2002  Oh ............................. 348/735
2003/0145328 A1 *  7/2003  Rabinowitz et al. .......... 725/72

FOREIGN PATENT DOCUMENTS

JP    09-121315    5/1997
JP    2000-041073    2/2000

OTHER PUBLICATIONS

Office Action issued from the Japanese Patent Office on Dec. 21, 2004, with respect to Japanese Patent Application No. 2003-19210, filed Jan. 28, 2003.

* cited by examiner

*Primary Examiner*—Don N. Vo
(74) *Attorney, Agent, or Firm*—Staas & Halsey LLP (57) ABSTRACT

A carrier recovery apparatus includes a first LPF calculating a carrier changing in accordance with a frequency offset, by using a pilot tone included in an I-signal of a VSB broadcasting signal, a limiter limiting a size of the carrier calculated by the first LPF and outputting the limited size of the carrier, a multiplier multiplying the limited size of the carrier from the limiter by a Q-signal of the VSB broadcasting signal, a second LPF extracting a DC-property corresponding to a frequency error of the carrier from a product output from the multiplier, a numerically controlled oscillator (NCO) generating a complex carrier corresponding to the DC-property from the second LPF, and a frequency error providing unit arranged between the second LPF and the NCO, storing the DC-property from the second LPF, and when the pilot tone is distorted by a damaged pilot in the I-signal, providing the NCO with the DC-property that is previously input and stored therein.

29 Claims, 7 Drawing Sheets

CARRIER RECOVERY APPARATUS OF VSB RECEIVER AND A METHOD OF RECOVERING CARRIER USING THE SAME

CROSS-REFERENCE TO RELATED APPLICATIONS

This application claims the benefit of Korean Patent Application No. 2002-5234, filed Jan. 29, 2002, in the Korean Intellectual Property Office, the disclosure of which is incorporated herein by reference.

BACKGROUND OF THE INVENTION

1. Field of the Invention

The present invention generally relates to a carrier recovery apparatus of a vestigial sideband VSB receiver, and more particularly, to a carrier recovery apparatus of a VSB receiver recovering a carrier based on a pilot tone of a pilot included in a broadcasting signal to recover the VSB digital broadcasting signal.

2. Description of the Related Art

At present, there are two modulation systems for a digital broadcasting signal. One is a vestigial sideband (VSB) modulation system, and the other is a coded orthogonal frequency division multiplexing (COFDM) modulation system. The VSB modulation system transmits broadcasting signals at a single carrier while the COFDM modulation system multi-divides and transmits the broadcasting signals through a multi-channel. Currently, the VSB modulation system is mainly adopted in various countries like Korea and the U.S.A. while the COFDM modulation system is mainly adopted in many European countries.

Figure 1:
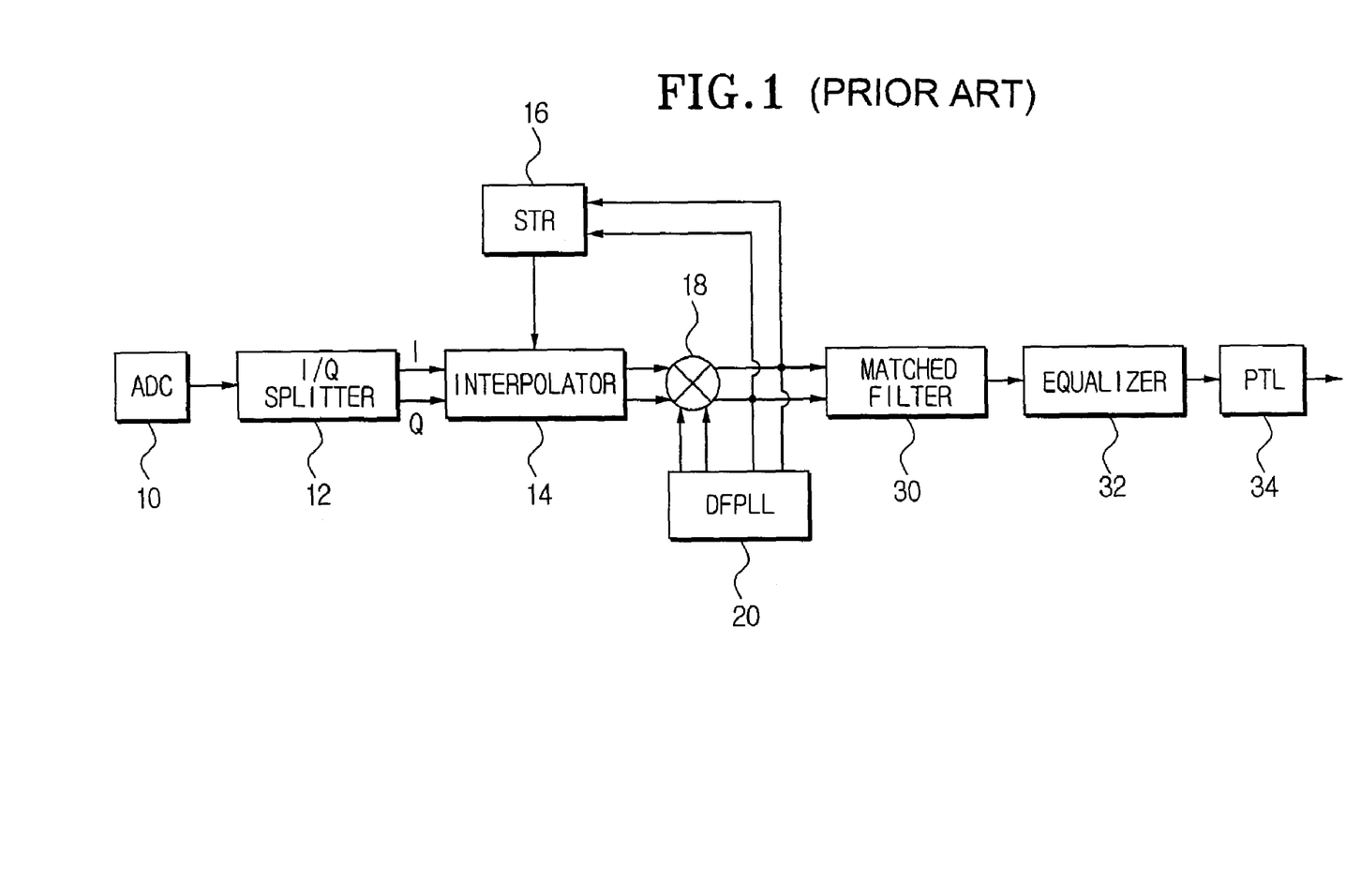
FIG. 1 is a block diagram of a conventional VSB broadcasting signal receiver.

FIG. 1 is a block diagram of a conventional digital broadcasting receiver receiving a VSB analog broadcasting signal that is modulated by a conventional VSB modulation system and transmitted. As shown in FIG. 1, the digital broadcasting receiver includes an analog-to-digital converter (ADC) 10, an I/Q splitter 12, an interpolator 14, a symbol timing recovery (STR) unit 16, a digital frequency phase locked loop (DFPLL) 20, a matched filter 30, an equalizer 32 and a phase tracking loop (PTL) 34.

The ADC 10 converts the received VSB analog broadcasting signal into a digital signal. The I/Q splitter 12 shifts the digital signal to a baseband signal to separate the baseband signal into an inphase (I) channel signal (I-signal) and a quadrature (Q) channel signal (Q-signal). The I-signal and Q-signal constitute a VSB broadcasting signal.

The interpolator 14 compensates for a sampling offset of the VSB broadcasting signal that has occurred during the conversion of the VSB analog broadcasting signal into the digital signal at the ADC 10. The interpolator 14 also detects clock information of the VSB broadcasting signal of which sampling offset is compensated. The STR unit 16 detects timing error information that has occurred with respect to a symbol of the VSB broadcasting signal during the conversion of VSB analog broadcasting signal into the digital signal. The STR unit 16 provides the interpolator 14 with the detected timing error information with respect to the symbol. Accordingly, the interpolator 14 compensates for the sampling offset of the VSB broadcasting signal based on the timing error information provided by the STR unit 16.

The DFPLL 20 recovers a carrier of the VSB broadcasting signal through the detected clock information and a pilot contained in the VSB broadcasting signal. That is, the DFPLL 20 recovers a frequency offset and phase distortions occurring in carriers of the VSB broadcasting signal. After the frequency offset and the phase distortions are recovered, the carriers are multiplied by the I-signal and Q-signal from the interpolator 14 at the multiplier 18 and then output to the matched filter 30.

The matched filter 30 combines the I-signal and Q-signal from the multiplier 18 to the VSB broadcasting signal and filters the VSB broadcasting signal so that a ratio of signal per noise of the combined VSB broadcasting signal can be maximized. The equalizing unit 32 compensates for an error occurred in a channel via which the VSB broadcasting signal is transmitted. The PTL 34 compensates for a remaining phase error in the VSB broadcasting signal.

Figure 2:
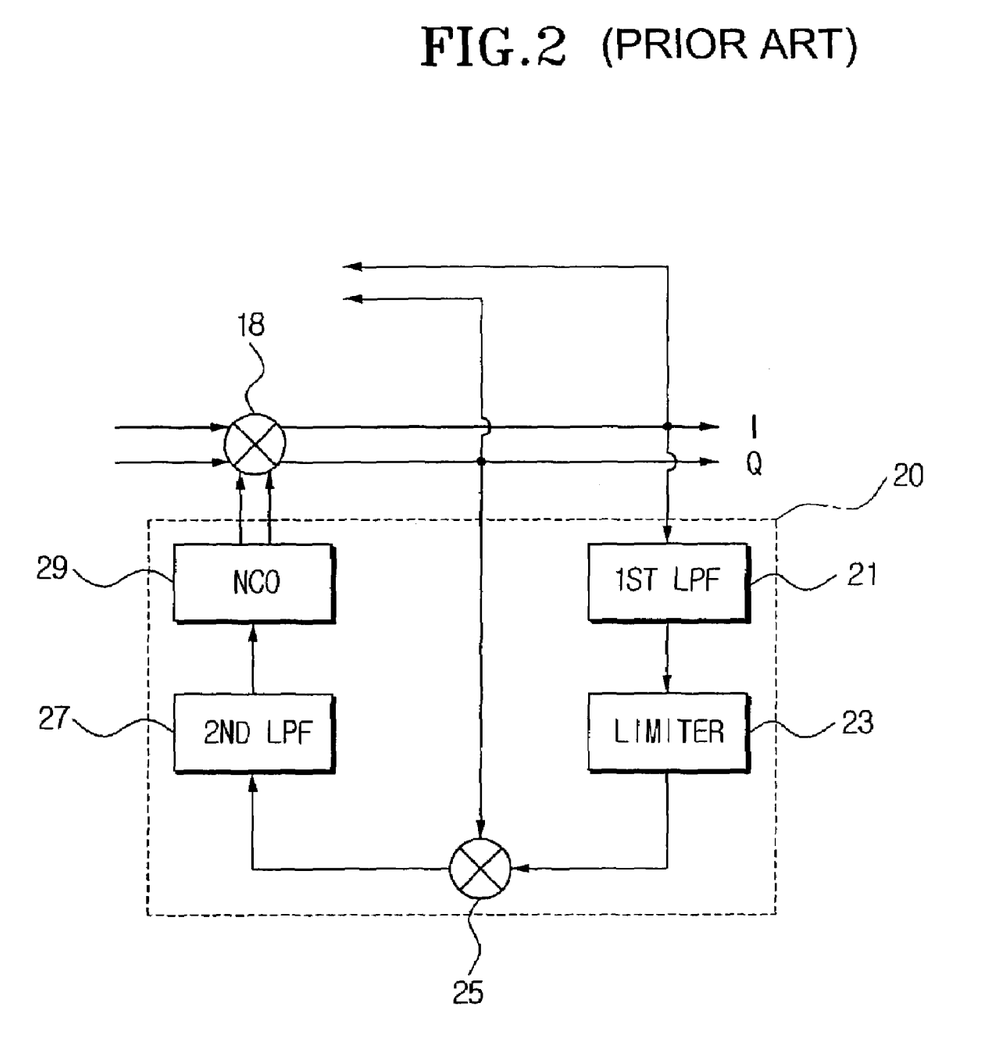
FIG. 2 is a block diagram for showing a DFPLL of the conventional VSB broadcasting signal receiver shown in FIG. 1.

FIG. 2 is a block diagram showing the DFPLL 20 of FIG. 1 in greater detail. The DFPLL 20 includes a first low pass filter (LPF) 21, a limiter 23, a second multiplier 25, a second LPF 27, and a numerically-controlled oscillator (NCO) 29.

The first LPF 21 indicates the I-signal, which is changed according to the frequency offset of the carrier, by using a pilot tone of the pilot contained in the I-signal of the VSB broadcasting signal that is shifted to a baseband by the I/Q splitter 12. If the frequency offset of the I-signal is positive (+), a phase change of −90 occurs in the carrier. If the frequency offset of the I-signal is negative (−), the phase change of +90 occurs in the carrier. The limiter 23 limits a size of the I-signal output from the first LPF 21. Accordingly, the limiter 23 outputs a pulse wave (limited size of the I-signal) of either value +1 or value −1 from the I-signal output from the first LPF 21. The multiplier 25 multiplies the pulse wave output from the limiter 23 by the Q-signal of the VSB broadcasting signal that is shifted to the baseband by the I/Q splitter 12. The second LPF 27 extracts a DC property from a product output from the multiplier 25. The DC property from the second LPF 27 indicates the frequency error of the carrier. The NCO 29 generates a complex carrier corresponding to the DC property extracted from the second LPF 27 and provides the multiplier 18 with the generated complex carrier. Accordingly, the multiplier 18 multiplies each of the I-signal and Q-signal from the interpolator 14 by the generated complex carrier from the NCO 29 and outputs the I-signal and Q-signal after the sampling offset of the carrier is recovered.

In the conventional VSB broadcasting signal receiver, however, a performance of the DFPLL 20 rapidly deteriorates when the pilot tone is damaged. This is because, a terrestrial wave transmitting a channel for the VSB broadcasting signal is usually transmitted through a multi-path transmitting channel, frequency responses of the transmitting channel include many 'nulls'. Accordingly, if a frequency band of even one pilot tone matches with one of the nulls, a damage of the pilot tone becomes worse compared to the received VSB analog broadcasting signal. As positions of the nulls of the received VSB analog broadcasting signals are irregular under a variable channel environment, the conventional VSB broadcasting signal receiver usually has an inaccurate recovery of the carrier through the DFPLL 20. More specifically, because the conventional DFPLL 20 recovers the carrier based on the pilot tone, a separate process like tracking has to be performed when the pilot disappears due to a noise and an error. If the carrier is not found even by the tracking, the recovery of the carrier becomes impossible.

SUMMARY OF THE INVENTION

Accordingly, it is an object of the present invention to provide a carrier recovery apparatus capable of efficiently recovering a carrier damaged due to a dynamic channel environment even when a pilot is damaged either temporarily or periodically.

Additional objects and advantageous of the invention will be set forth in part in the description which follows and, in part, will be obvious from the description, or may be learned by practice of the invention.

The above and other objects are accomplished by a carrier recovery apparatus of a Vestigial Sideband (VSB) broadcasting signal according to an aspect of the present invention. The carrier recovery apparatus includes a first low pass filter (LPF) calculating a carrier changing in accordance with a frequency offset by using a pilot tone included in an I-signal of the VSB broadcasting signal, a limiter limiting a size of the carrier calculated by the first LPF, a multiplier multiplying the limited size of the carrier from the limiter by a Q-signal of the VSB broadcasting signal, a second LPF extracting a DC-property corresponding to a frequency error of the carrier from a product transmitted from the multiplier, a numerically-controlled oscillator (NCO) generating a complex carrier corresponding to the DC-property extracted from the second LPF, and a frequency error providing unit storing the DC-property extracted from the second LPF in a memory and when the pilot tone is distorted by the damaged pilot of the I-signal, providing the NCO with the stored DC-property which has been previously input to and stored in the memory.

The frequency error providing unit includes a register storing the DC-property from the second LPF for a predetermined time and outputting the DC-property in accordance with a control signal, a switching unit selectively outputting the DC-property from one of the register and the second LPF in accordance with the control signal, a mode control unit receiving information from a matched filter about a pilot damage of a pilot occurring due to a changeable channel environment and controlling an output of the switching unit in accordance with the received information about the pilot damage, the matched filter combining the I-signal and the Q-signal in which the carrier is recovered, and a counting unit counting a control time of the mode control unit which performs controlling of the switching unit and the register by generating the control signal when it is determined according to the received information about the pilot damage that the pilot is damaged, and providing the mode control unit with time-over information when the counted control time exceeds a predetermined reference control time, whereby the mode control unit controls the switching unit to output the DC-property from the second LPF in accordance with the time-over information.

The mode control unit controls the switching unit to output the DC-property from the register when it is determined according to the received information about the pilot damage that the pilot is damaged, while controlling the switching unit to output the DC-property from the second LPF when it is determined according to the received information about the pilot damage that the pilot is not damaged.

The NCO generates a fixed complex carrier in response to the DC-property from the register when the pilot is damaged and thus the switching unit outputs the DC-property from the register in response to the control signal of the mode control unit. The first LPF is an automatic frequency control low pass filter (AFC-LPF), and the second LPF is an automatic phase control low pass filter (APC-LPF).

The above and other objects are also accomplished by providing a Vestigial Sideband (VSB) broadcasting signal receiver according to another aspect of the present invention. The VSB broadcasting signal receiver includes an analog-to-digital converter (ADC) converting an analog VSB broadcasting signal into a digital signal; an I/Q splitter shifting the digital signal to a baseband signal and splitting the baseband signal into an I-signal and a Q-signal which constitute a VSB broadcasting signal, a symbol timing recovery (STR) unit detecting a sampling timing error of the VSB broadcasting signal with respect to the I-signal and the Q-signal, respectively; an interpolator compensating for a sampling offset of the I-signal and the Q-signal in accordance with the sampling timing error detected by the STR unit; a multiplier multiplying each of the I-signal and the Q-signal from the interpolator by a complex carrier, a carrier recovery unit recovering a carrier of the VSB broadcasting signal based on the complex carrier corresponding to a frequency error of the VSB broadcasting signal calculated from a pilot tone of a pilot, when the pilot included in the I-signal is damaged, a matched filter generating the VSB broadcasting signal by combining the I-signal and the Q-signal output from the multiplier, and an equalizer compensating for a distortion of the VSB broadcasting signal occurring in a transmitting channel with respect to the VSB broadcasting signal from the matched filter.

The carrier recovery unit includes a first low pass filter (LPF) calculating the carrier changing in accordance with a frequency offset of the VSB broadcasting signal by using the pilot tone included in the I-signal, a limiter limiting a size of the carrier from the first LPF and outputting the limited size of the carrier, a multiplier multiplying the limited size of the carrier from the limiter by the Q-signal, a second low pass filter (LPF) extracting a DC-property corresponding to the frequency error of the carrier from a product transmitted from the multiplier, a numerically-controlled oscillator (NCO) generating the complex carrier corresponding to the DC-property extracted from the second LPF, and a frequency error providing unit storing the DC-property from the second LPF in a memory, and when the pilot tone is distorted due to a damaged pilot of the I-signal, providing the NCO with the stored DC-property which has been previously input and stored therein.

The frequency error providing unit includes a register storing the DC-property from the second LPF for a predetermined time and outputting the DC-property in accordance with a control signal, a switching unit selectively outputting the DC-property from one of the register and the second LPF in accordance with the control signal, a mode control unit receiving from the matched filter information about a pilot damage of a pilot by a change of a channel environment and controlling an output of the switching unit in accordance with the received information about the pilot damage, and a counting unit counting a control time of the mode control unit that performs controlling of the register and the switching unit by generating the control signal upon determining according to the received information about the pilot damage that the pilot is damaged, and providing the mode control unit with time-over information when the counted control time exceeds a predetermined reference control time, whereby the mode control unit controls the switching unit to output the DC-property from the second LPF in accordance with the provided time-over information.

The mode control unit controls the switching unit to output the DC-property from the register when it is determined according to the received information about the pilot damage that the pilot is damaged, while controlling the switching unit to output the DC-property from the second LPF when it is determined according to the received information about the pilot damage that the pilot is not damaged. The NCO generates a fixed complex carrier in response to the DC-property transmitted from the register when the pilot is damaged and thus the switching unit outputs the DC-property from the register in response to the control signal of the mode control unit. The first LPF is an automatic frequency control low pass filter (AFC-LPF), and the second LPF is an automatic phase control low pass filter (APC-LPF). Further provided is a phase tracking loop (PTL) compensating for a remaining phase error in the VSB broadcasting signal after equalization of the VSB broadcasting signal by the equalizer.

The above and other objects are also accomplished by a method of recovering a carrier of a Vestigial Sideband (VSB) broadcasting signal according to another aspect of the present invention. The method includes calculating a carrier of the VSB broadcasting signal by using a pilot tone included in an I-signal of the VSB broadcasting signal after the carrier of the VSB broadcasting signal is changed in accordance with a frequency offset, limiting the size of the calculated carrier and outputting the limited size of the carrier, multiplying the limited size of the carrier by a Q-signal of the VSB broadcasting signal, extracting a DC-property corresponding to a frequency error of the carrier from a product of the multiplication, storing the DC-property in a memory, and selectively outputting the DC-property, e.g., one of a first DC-property previously input to and stored in the memory and a second DC-property newly generated in response to a second product of the multiplication and replacing the first DC-property, according to a determination of whether the pilot of the I-signal is damaged, and generating a complex carrier corresponding to the output DC-property which is either the first DC-property or the second DC-property.

The selective outputting of the DC-property comprises storing for a predetermined time the first DC-property extracted in the extracting operation and outputting the first DC-property in accordance with a control signal, receiving information about a pilot damage of the pilot occurring due to changes in a channel environment, selectively controlling the outputting of the first DC-property and the second DC-property in accordance with the information about the pilot damage, and when it is determined according to the information about the pilot damage that the pilot is damaged, counting a control time of the controlling operation for the damaged pilot, and when the counted control time exceeds a predetermined reference control time, outputting the second DC-property.

The output controlling operation controls the outputting of the DC-property so that the first DC-property is output when it is determined according to the information about the pilot damage that the pilot is damaged, while the second DC-property is output when it is determined according to the information about the plot damage that the pilot is not damaged.

The carrier of the VSB broadcasting signal having the damaged pilot is recovered based on the complex carrier corresponding to the previously calculated frequency error. Accordingly, a carrier recovery of the VSB broadcasting signal is performed efficiently.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

From now on, the present invention will be described in greater detail by referring to the appended drawings.

Figure 3:
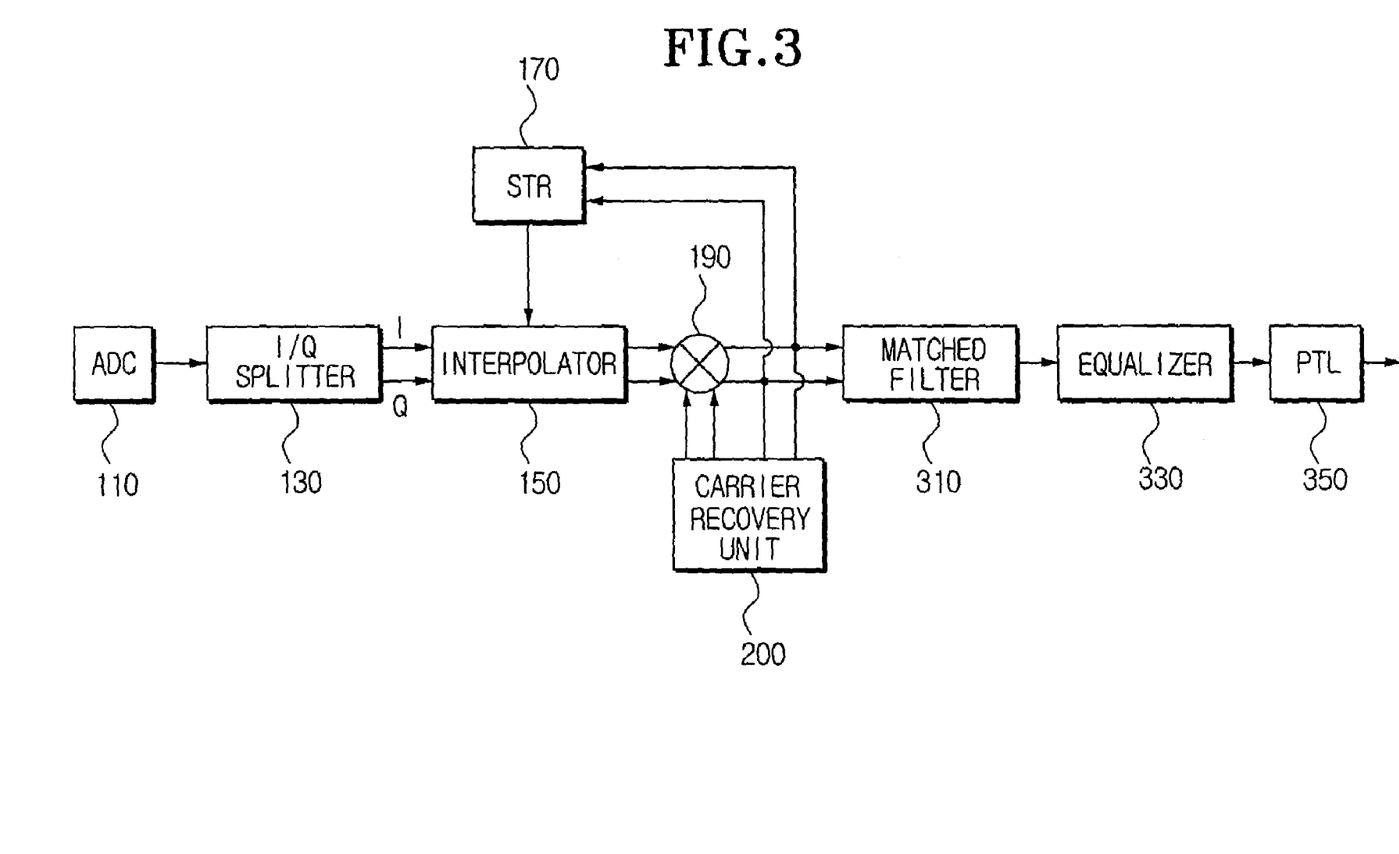
FIG. 3 is a block diagram showing a VSB broadcasting signal receiver recovering a carrier of a VSB broadcasting signal according to an embodiment of the present invention.

FIG. 3 is a block diagram showing a VSB broadcasting receiver recovering a carrier according to an embodiment of the present invention.

The VSB broadcasting signal receiver includes an analog-to-digital converter (ADC) 110, an in-phase/quadrature (I/Q) splitter 130, an interpolator 150, a symbol timing recovery (STR) unit 170, a carrier recovery unit 200, a matched filter 310, an equalizer 330 and a phase tracking loop 350.

The ADC 110 converts a received analog VSB broadcasting signal into a digital signal. The I/Q splitter 130 shifts the digital signal to a baseband signal and splits the base band signal into an in-phase signal (hereinafter called I-signal) and a quadrature (Q) signal (hereinafter called Q-signal). The I-signal and the Q-signal constitute a VSB broadcasting signal.

The interpolator 150 compensates for a sampling timing offset of the VSB broadcasting signal, which has occurred when the analog VSB broadcasting signal is converted into the digital signal in the ADC 110. The interpolator 150 detects clock information of the VSB broadcasting signal after the sampling timing offset is compensated. The STR unit 170 detects a sampling timing error with respect to a symbol of the VSB broadcasting signal, which has occurred when the analog VSB broadcasting signal is converted into the digital signal in the ADC 110. The STR unit 170 provides the interpolator 150 with sampling timing error information of the symbol. Accordingly, the interpolator 150 compensates for the sampling timing error that has occurred in the symbol of the VSB broadcasting signal, based on the sampling timing error information provided by the STR unit 16.

The carrier recovery unit 200 extracts a frequency error of the VSB broadcasting signal based on the clock information detected at the interpolator 150 and a pilot tone of a pilot contained in the VSB broadcasting signal, calculates a complex carrier corresponding to the extracted frequency error, and then recovers the carrier. Accordingly, the carrier recovery unit 200 recovers a frequency offset and phase distortions which occurred in the carriers of the VSB broadcasting signal. According to an aspect of the present invention, the carrier recovery unit 200 determines whether the pilot contained in the I-signal from the interpolator 150 is damaged. When the pilot is determined as being damaged, the carrier of the VSB broadcasting signal is recovered based on the complex carrier corresponding to the frequency error of the VSB broadcasting signal, which was calculated in advance based on the pilot tone. After the frequency offset and the phase distortions are recovered, the carrier is multiplied by the I-signal and Q-signal from the interpolator 150 by the multiplier 190, and then a product of the multiplier 190 is output to the matched filter 310.

The matched filter 310 combines the I-signal and Q-signal from the multiplier 190 into the VSB broadcasting signal, and filters the VSB broadcasting signal so that a ratio of signal per noise of the VSB broadcasting signal can be maximized. According to another aspect of the present invention, it is possible that the matched filter 310 provides the carrier recovery unit 200 with a pilot DC property of the combined VSB broadcasting signal. The DC property that is provided by the matched filter 310 corresponds to the information about the damage in the pilot that has occurred due to a change in a transmitting channel environment. Based on the information about the damage of the pilot provided from the matched filter 310, the carrier recovery unit 200 recovers the carrier. The equalizer 330 compensates for an error that has occurred in a broadcasting signal transmitting channel of the VSB broadcasting signal. The PTL 350 compensates for a remaining phase error in the VSB broadcasting signal that is output after the error is compensated in the equalizer 330.

As the carrier of the VSB broadcasting signal having the damaged pilot is recovered based on the complex carrier corresponding to a previously calculated frequency error, a carrier recovery efficiency of the carrier recovery unit 200 is improved. Especially since the carrier of the VSB broadcasting signal having the damaged pilot occurring when the VSB broadcasting signal is transmitted through the transmitting channel in a dynamic environment is recovered based on a previously calculated complex carrier, a signal recovery performance of the VSB broadcasting signal is enhanced.

Figure 4:
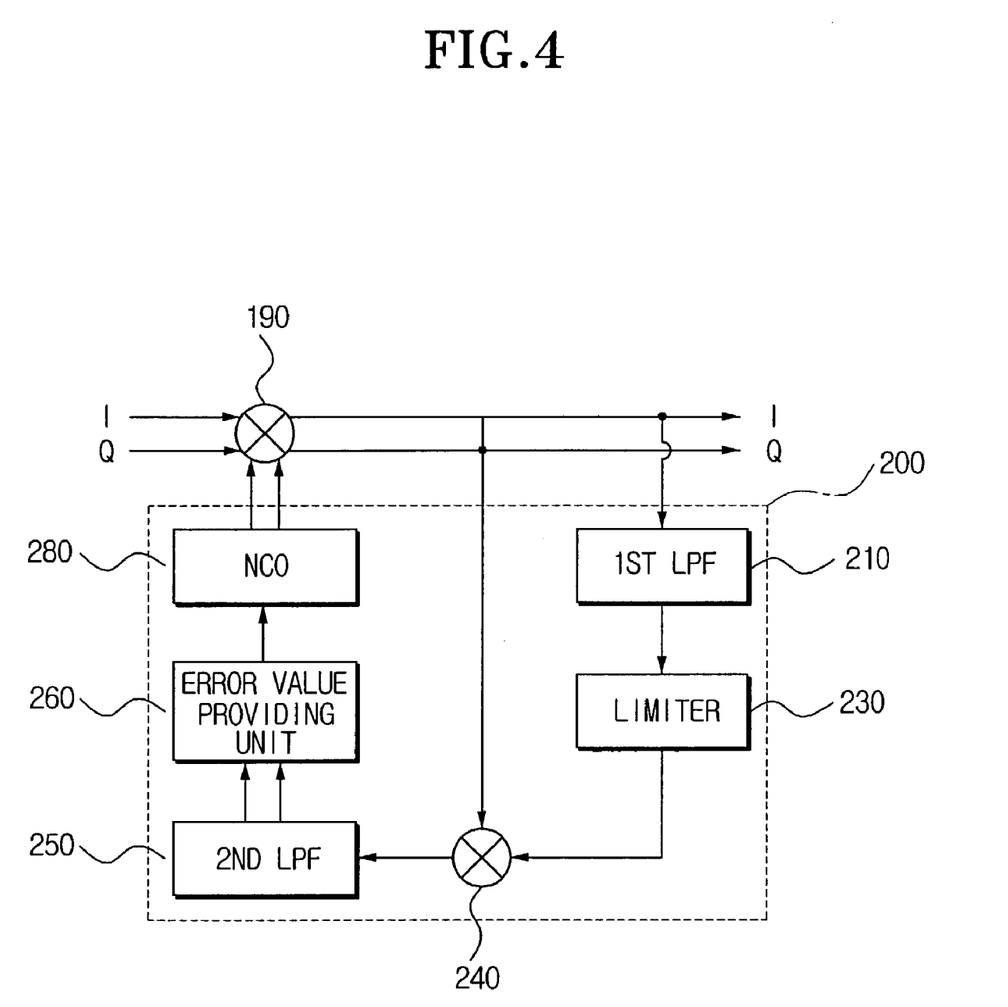
FIG. 4 is a block diagram showing a carrier recovering unit of the VSB broadcasting signal receiver shown in FIG. 3.

FIG. 4 is a block diagram showing the carrier recovery unit 200 of FIG. 3. The carrier recovery unit 200 includes a first low pass filter (LPF) 210, a limiter 230, a multiplier 240, a second LPF 250, an error value providing unit 260 and a numerically-controlled oscillator 280.

The first LPF 210 indicates the I-signal changed in accordance with the frequency offset of the carrier by using the pilot tone included in the I-signal of the VSB broadcasting signal shifted to the baseband by the I/Q splitter 130. When the frequency offset of the I-signal is positive '+', a phase change of −90° occurs in the carrier. When the frequency offset of the I-signal is negative '−', the phase change of +90° occurs in the carrier. An automatic frequency control low pass filter (AFC-LPF) is used for the first LPF 210. The limiter 230 limits a size of the I-signal output from the first LPF 210. Accordingly, the limiter 230 outputs a pulse wave (the limited size) of the I-signal from the first LPF 210. The multiplier 240 multiplies the pulse wave from the limiter 230 by the Q-signal of the VSB broadcasting signal that has been shifted to a baseband by the I/Q splitter 130.

The second LPF 250 extracts a DC-property from the product output from the multiplier 240. The DV-property extracted by the second LPF 250 indicates the frequency error of the carrier. As for the second LPF 250, an automatic phase control low pass filter (APC-LPF) is used. The first LPF 210, the limiter 230, the multiplier 240, and the second LPF 250 constitute a filter unit generating the DC-property indicating the frequency error of the carrier of the VSB broadcasting signal. The error value providing unit 260 is provided between the second LPF 250 and the NCO 280 to store the DC-property corresponding to the frequency error of the carrier extracted by the second LPF 250 in a memory. When the pilot of the I-signal is damaged and thus the pilot tone is distorted, the error value providing unit 260 provides the NCO 280 with the DC-property which has been previously input from the second LPF 250 and stored in the memory, based on the information (pilot DC property) provided by the matched filter 310 about the damage of the pilot. The NCO 280 generates the complex carrier corresponding to the DC-property provided by the error value providing unit 260 and provides the multiplier 190 with the generated complex carrier. The multiplier 190 multiplies the complex carrier from the NCO 280 by each of the I-signal and Q-signal from the interpolator 150 to thereby output recovered I-signal and Q-signal of the VSB broadcasting signal of which the frequency offset is recovered.

Figure 5:
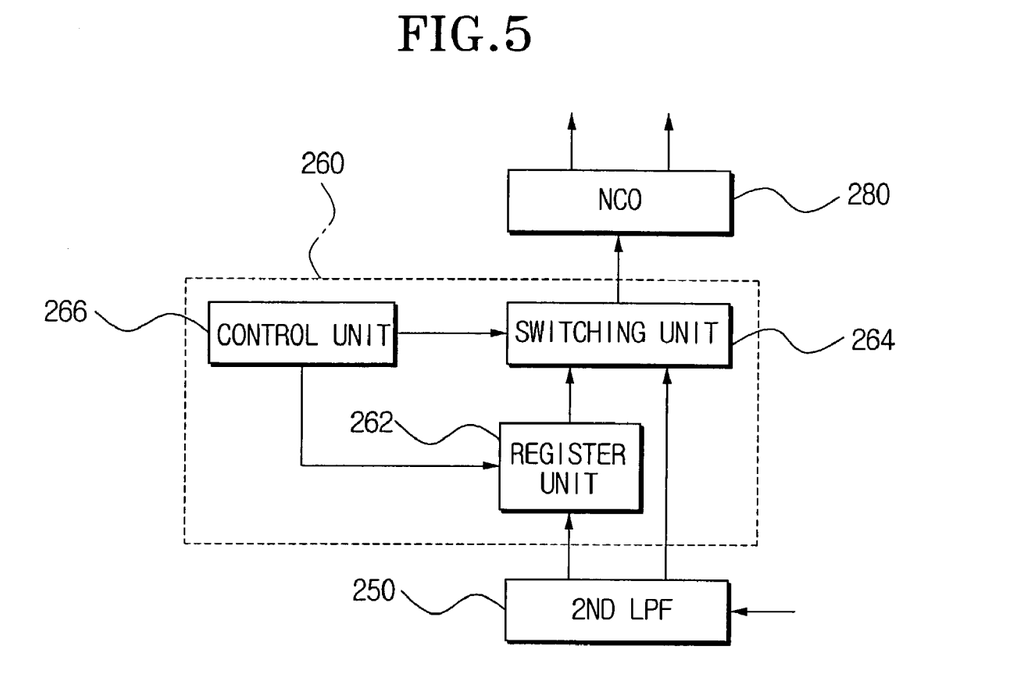
FIG. 5 is a block diagram showing an error value providing unit of the carrier recovering unit shown in FIG. 4.

FIG. 5 is a block diagram showing the error value providing unit 260 of FIG. 4 in detail. The error value providing unit 260 includes a register 262 as the memory, a switching unit 264 and a control unit 266. The register 262 stores the DC-property from the second LPF 250 for a predetermined time and outputs the DC-property to the switching unit 262 in accordance with a control signal of the control unit 166. While storing a plurality of neighboring DC-properties, the register 262 stores the DC-properties by order of input. Accordingly, the register 262 first stores a first DC-property and then stores a second DC-property following the first DC-property, sequentially. The register 262 also outputs the DC-properties by order of input. Accordingly, the register 262 outputs the first DC-property and then the second DC-property, sequentially.

The switching unit 264 selectively outputs one of the DC-properties from the register 262 and the second LPF 250 in accordance with the control signal of the control unit 266. The control unit 266 receives the pilot DC-property provided by the matched filter 310, i.e., receives the information about the damage of the pilot by the change of the channel environment, and controls an output of the switching unit 264 in accordance with the received information. It is possible that when it is determined according to the received information that the pilot is damaged, the control unit 266 controls the switching unit 264 to output the DC-property, e.g., the first DC property, from the register 262 to the NCO 280. When it is determined based on the received information that there is no damage to the pilot, the control unit 266 controls the switching unit 264 to output the DC-property, e.g., the second DC property, from the second LPF 250 to the NCO 280.

Accordingly, when there is no damage to the pilot, the NCO 280 generates the complex carrier corresponding to the new DC-property extracted by the second LPF 250, and provides the multiplier 190 with a newly extracted DC-property, e.g., the second DC-property. Also, when there is no damage to the pilot, the NCO 260 generates the complex carrier corresponding to the DC-property stored in the register 262 and output to the NCO 260.

Figure 6:
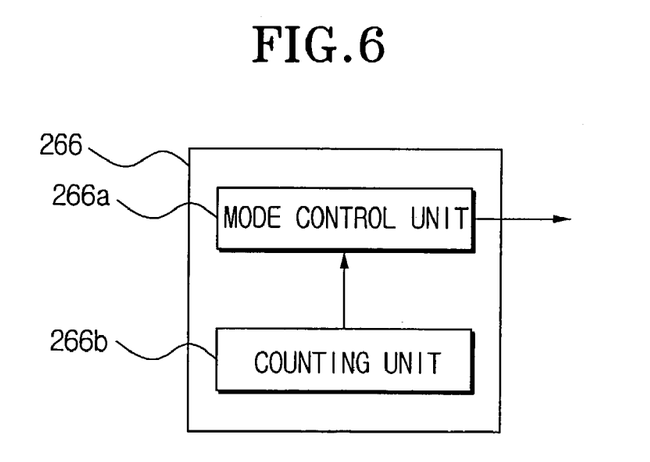
FIG. 6 is a block diagram showing a control unit of the error value providing unit shown in FIG. 5.

FIG. 6 is a block diagram showing the control unit 266 of FIG. 5 in detail. The control unit 266 includes a mode control unit 266a and a counting unit 266b. The mode control unit 266a receives the pilot DC-property, i.e., the information provided by the matched filter 310 about the damage of the pilot occurring due to the change of the channel environment, and controls the output of the switching unit 264 in accordance with the received information about the pilot damage. The counting unit 266b counts a control time of the mode control unit 266a over the switching unit 264 in accordance with a degree of the damage when it is determined that the pilot is damaged. When a predetermined control time passes, the counting unit 266b provides the mode control unit 266a with time-over information representing that the predetermined control time has passed. According to the time-over information from the counting unit 266b, the mode control unit 266a controls the switching unit 264 to output the DC-property from the second LPF 250 to the NCO 262.

Figure 7:
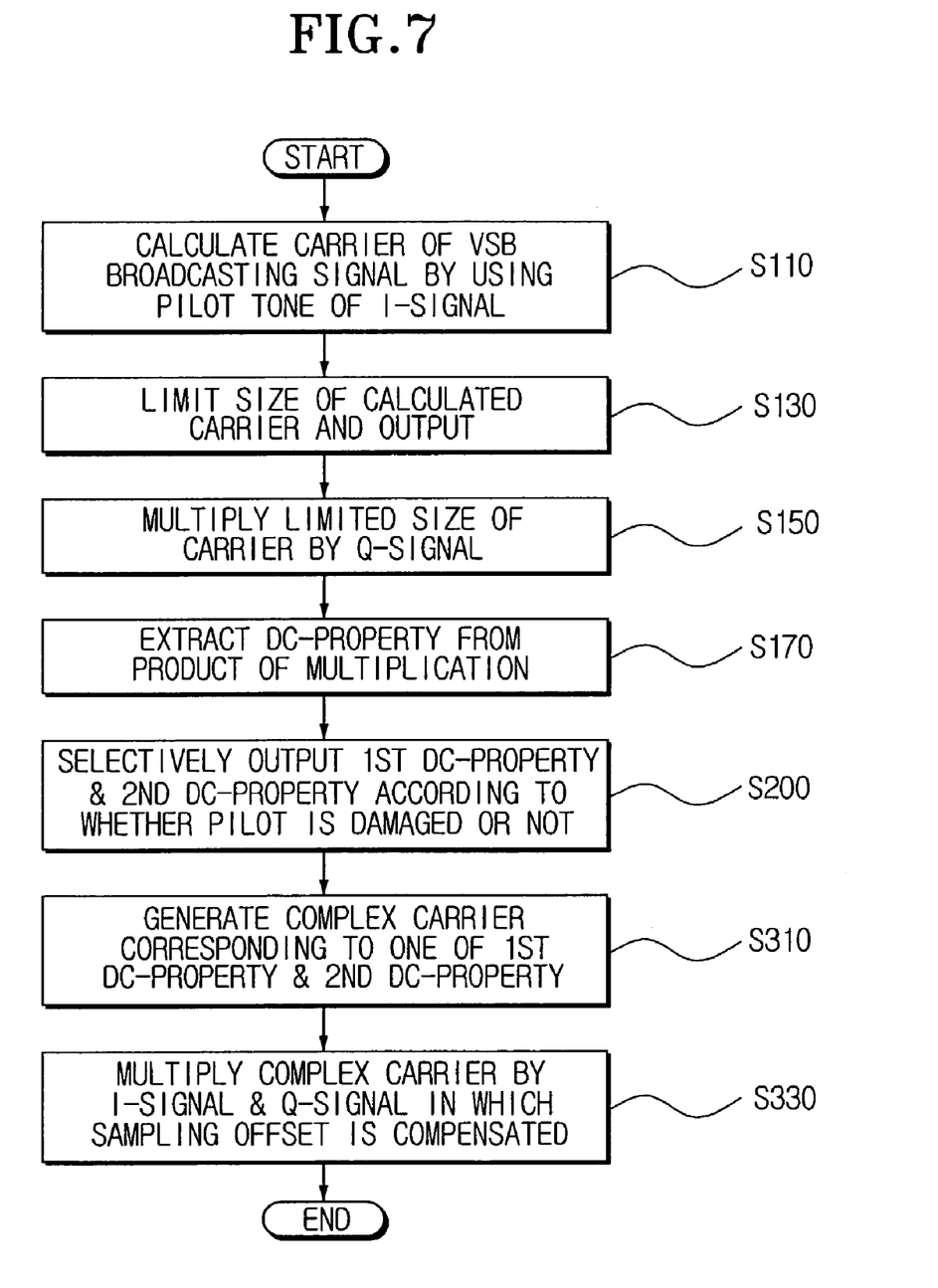
FIG. 7 is a flowchart showing a method of recovering a carrier of a VSB broadcasting signal according to another embodiment of the present invention.

FIG. 7 is a flowchart showing a method of recovering the carrier of the VSB broadcasting signal according to another aspect of the present invention.

First, the first LPF 210 calculates the carrier of the VSB broadcasting signal by using the pilot tone of the I-signal output from the interpolator 150 in operation S110. At this time, the calculated carrier has the phase error either of −90° or +90°. The limiter 230 limits the size of the carrier calculated by the first LPF 210 in a predetermined size, and outputs the limited size of the carrier as a pulse wave in operation S150. The multiplier 240 multiplies the size of the carrier limited and output from the limiter 230 by the Q-signal output from the interpolator 150 in operation S130. The second LPF 250 extracts the DC-property corresponding to the frequency error of the carrier, based on the product output from the multiplier 240 in operation S170.

The error value providing unit 260 stores the DC-property from the second LPF 250 as the first DC-property, and selectively outputs one of the previously input and stored first DC-property and the second DC-property sequentially generating after the first DC-property is stored, to the NCO 280 in accordance with a presence of the damage in the pilot in operation S200. The NCO 280 generates the complex carrier corresponding to the first DC-property or the second DC-property that is output from the error value providing unit 260 in operation S310. Accordingly, the multiplier 190 multiplies each of the I-signal and Q-signal of which sampling timing offset is compensated in the interpolator 150, by the complex carrier provided from the NCO 280, to thereby compensate for the carrier distortion of the VSB broadcasting signal.

Figure 8:
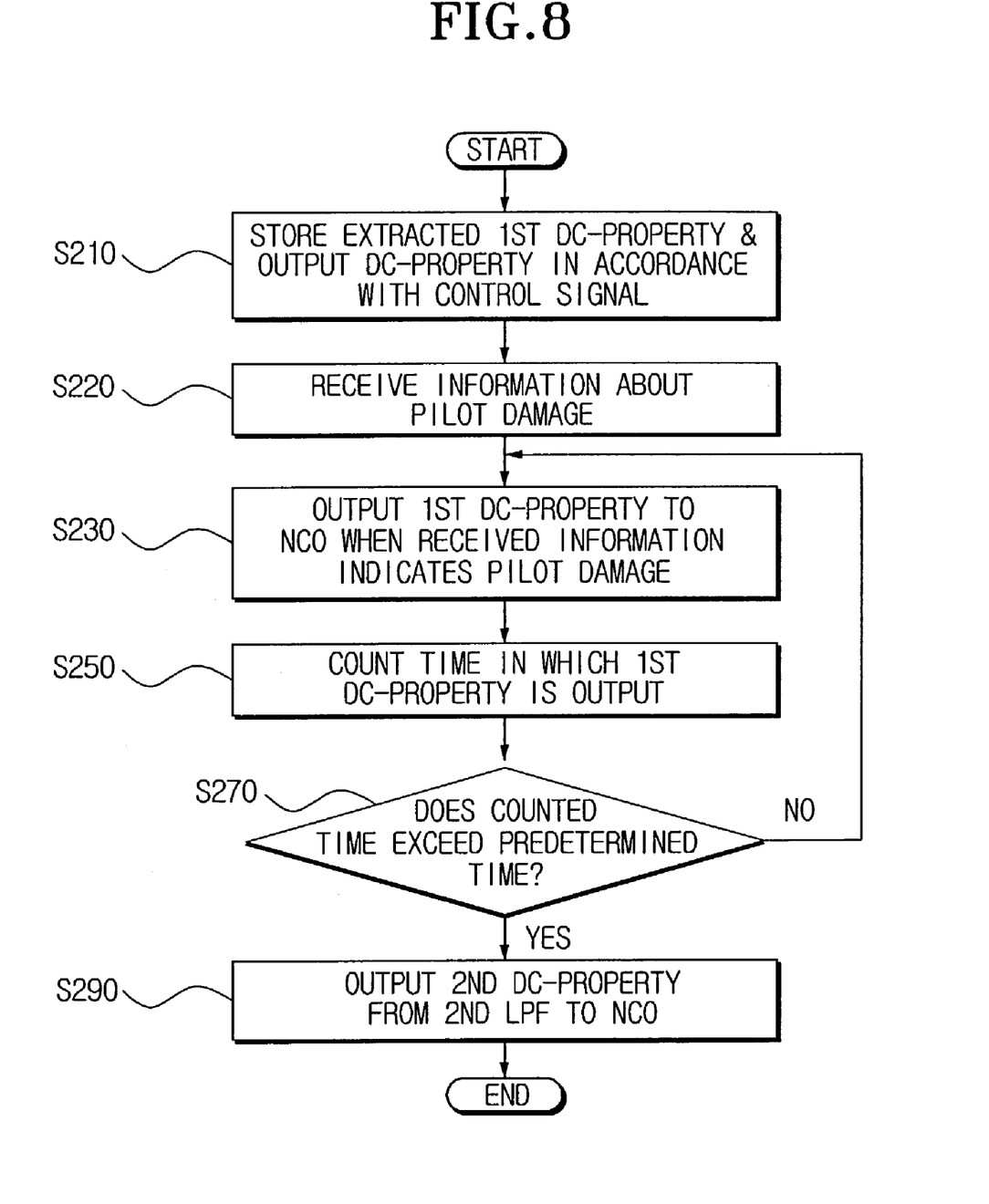
FIG. 8 is a flowchart showing selectively outputting a DC property of the method shown in FIG. 7.

FIG. 8 is a flowchart showing selectively outputting of the DC-property in operation S200 of FIG. 7 in detail. The register 262 stores the first DC-property transmitted from the second LPF 250 and outputs the stored first DC-property to the switching unit 264 in accordance with the control signal in operation S210. Meanwhile, the mode control unit 266a receives the information about damage of the pilot in operation S220. The mode control unit 266a determines whether the pilot is damaged based on the received information about the pilot damage. If it is determined that the pilot has been damaged, the mode control unit 266a controls the switching unit 264 to select and output the first DC-property from the register 262 to the NCO 280 in operation S230.

The counting unit 266b counts the control time of the mode control unit 266a controlling the switching unit 264 to output the first DC-property from the register 262 in operation S250. The counting unit 266b provides the mode control unit 266a with the counted control time. The mode control unit 266a determines whether the counted control time provided by the counting unit 266b exceeds a predetermined reference control time for shifting an output mode of the switching unit 264 in operation S270. If it is determined that the counted time does not exceed the predetermined reference control time, processes from S230 through S270 are repeated. If it is determined that the counted control time exceeds the predetermined control time in S270, the mode control unit 266a controls the switching unit 264 to select and output the second DC-property from the second LPF 250 to the NCO 280 in operation S290.

When the pilot is damaged, the carrier of the VSB broadcasting signal is recovered for a predetermined time to shift the output mode of the switching unit 264 to output the DC-property that is stored in the register 262, corresponding to the previously calculated frequency error of the VSB broadcasting signal. Accordingly, a hindrance to the carrier recovery due to the damaged pilot can be solved. Further, a signal receiving efficiency of the VSB broadcasting signal receiver is improved.

According to the present invention, the carrier of the VSB broadcasting signal having the damaged pilot is recovered based on the complex carrier corresponding to the previously calculated frequency error. Accordingly, the carrier recover of the VSB broadcasting signal is performed efficiently.

Further, as the carrier of the VSB broadcasting signal transmitted through the channel in the dynamic environment is recovered through the previously calculated complex carrier in a case that the pilot is damaged, the signal recovery performance of the receiver is improved.

Although the preferred embodiment of the present invention has been described, it will be understood by those skilled in the art that the present invention should not be limited t the described preferred embodiment, but various changes and modifications can be made within the spirit and scope of the present invention as defined by the appended claims and their equivalents.

What is claimed is:

1. A carrier recovery apparatus of a Vestigial Sideband (VSB) broadcasting signal having an I-signal and a Q-signal, comprising:
   a first low pass filter (LPF) calculating a carrier of the VSB broadcasting signal changing in accordance with a frequency offset of the VSB broadcasting signal by using a pilot tone included in the I-signal of the VSB broadcasting signal;
   a limiter limiting a size of the carrier calculated by the first LPF;
   a multiplier multiplying the limited size of the carrier from the limiter by the Q-signal of the VSB broadcasting signal to generate a product;
   a second LPF extracting a DC-property signal corresponding to a frequency error of the carrier from the product from the multiplier;
   a numerically-controlled oscillator (NCO) generating a complex carrier corresponding to the DC-property signal extracted from the second LPF; and
   a frequency error providing unit storing the DC-property signal extracted from the second LPF, and when the pilot tone is distorted by a damaged pilot of the I-signal, providing the NCO with the stored DC-property signal.

2. The carrier recovery apparatus of claim 1, further comprising a matched filter generating the VSB broadcasting signal from the I-signal and the Q-signal which have been multiplied by the complex carrier of the NCO, and generating information representing a damage of a pilot occurring due to a change of a channel environment, wherein the frequency error providing unit comprises:

a register storing the DC-property signal from the second LPF for a predetermined time and outputting the DC-property signal;

a switching unit selectively outputting one of the stored DC-property signal from the register and a second DC-property signal newly generated by the second LPF;

a mode control unit receiving the information from the matched filter and controlling an output of the switching unit in accordance with the received information; and a counting unit counting a control time of the mode control unit which performs controlling of the register and the switching unit in response to determining according to the received information about the pilot damage that the pilot is damaged, and providing the mode control unit with time-over information when the counted control time exceeds a reference time, wherein the mode control unit controls the switching unit to output the second DC-property signal from the second LPF in accordance with the time-over information.

3. The carrier recovery apparatus of claim 2, wherein the mode control unit controls the switching unit to output the DC-property signal from the register in response to determining according to the received information about the pilot damage that the pilot is damaged, while controlling the switching unit to output the second DC-property signal from the second LPF in response to determining according to the received information about the pilot damage that the pilot is not damaged.

4. The carrier recovery apparatus of claim 3, wherein the NCO generates a fixed complex carrier in response to the DC-property signal from the register, when the pilot is damaged and thus the switching unit outputs the DC-property signal from the register in response to a control signal of the mode control unit.

5. The carrier recovery apparatus of claim 4, wherein the first LPF comprises an automatic frequency control low pass filter (AFC-LPF), and the second LPF comprises an automatic phase control low pass filter (APC-LPF).

6. A Vestigial Sideband (VSB) broadcasting signal receiver comprising:

an analog-to-digital converter (ADC) converting an analog VSB broadcasting signal into a digital signal;

an I/Q splitter shifting the digital signal to a baseband signal and splitting the baseband signal into an I-signal and a Q-signal constituting a VSB broadcasting signal;

a symbol timing recovery (STR) unit detecting a sampling timing error of the VSB broadcasting signal with respect to I-signal and Q-signal, respectively;

an interpolator compensating for a sampling offset of the I-signal and the Q-signal in accordance with the sampling timing error detected by the STR unit;

a carrier recovery unit generating the complex carrier corresponding to a frequency error of the VSB broadcasting signal calculated from a pilot tone of a pilot of the VSB broadcasting signal when the pilot included in the I-signal is damaged;

a multiplier multiplying each of the I-signal and the Q-signal by the complex carrier to recover a carrier of the VSB broadcasting signal based on the complex carrier to generate a product;

a matched filter generating the VSB broadcasting signal by combining the I-signal and the Q-signal in response to the product of the multiplier; and an equalizer compensating for a distortion of the VSB broadcasting signal occurring in a transmitting channel with respect to the VSB broadcasting signal from the matched filter, wherein the carrier recovery unit comprises:

a first low pass filter (LPF) calculating the carrier changing in accordance with a frequency offset, by using the pilot tone included in the I-signal;

a limiter limiting a size of the carrier from the first LPF and outputting the limited size of the carrier;

a second multiplier multiplying the limited size of the carrier from the limiter by the Q-signal to generate a second product;

a second low pass filter (LPF) extracting a DC-property signal corresponding to the frequency error of the carrier from the second product of the second multiplier;

a numerically-controlled oscillator (NCO) generating the complex carrier corresponding to the DC-property signal extracted from the second LPF; and a frequency error providing unit storing the DC-property signal from the second LPF, and when the pilot tone is distorted due to a damaged pilot of the I-signal, providing the NCO with the stored DC-property signal which is previously input and stored therein.

7. The VSB broadcasting signal receiver of claim 6, wherein the frequency error providing unit comprises:

a register storing the DC-property signal from the second LPF for a predetermined time and outputting the DC-property signal;

a switching unit selectively outputting the DC-property signal from one of the register and the second LPF;

a mode control unit receiving from the matched filter information about a pilot damage of the pilot occurring due to a change of a channel environment, and controlling an output of the switching unit in accordance with the received information about the pilot damage; and a counting unit counting a control time of the mode control unit that performs controlling the switching unit and the register upon determining according to the received information about the pilot damage that the pilot is damaged, and providing the mode control unit with time-over information when the counted control time exceeds a reference time, wherein the mode control unit controls the switching unit to output the DC-property signal from the second LPF in accordance with the provided time-over information.

8. The VSB broadcasting signal receiver of claim 7, wherein the mode control unit controls the switching unit to output the DC-property signal from the register in response to determining according to the received information about the pilot damage that the pilot is damaged while controlling the switching unit to output the DC-property signal from the second LPF in response to determining according to the received information about the pilot damage that the pilot is not damaged.

9. The VSB broadcasting signal receiver of claim 8, wherein the NCO generates a fixed complex carrier in response to the DC-property signal from the register when the pilot is damaged and thus the switching unit outputs the DC-property signal from the register in response to a control signal of the mode control unit.

10. The VSB broadcasting signal receiver of claim 9, wherein the first LPF comprises an automatic frequency control low pass filter (AFC-LPF), and the second LPF comprises an automatic phase control low pass filter (APC-LPF).

11. The VSB broadcasting signal receiver of claim 6, further comprising:
a phase tracking loop (PTL) compensating for a remaining phase error in the VSB broadcasting signal after the distortion of the VSB broadcasting signal is compensated by the equalizer.

12. A method of recovering a carrier of a Vestigial Sideband (VSB) broadcasting signal, comprising:
calculating a carrier of the VSB broadcasting signal by using a pilot tone included in an I-signal of the VSB broadcasting signal after the carrier of the VSB broadcasting signal is changed in accordance with a frequency offset;
limiting a size of the calculated carrier and outputting the limited size of the carrier;
multiplying the limited size of the carrier by a Q-signal of the VSB broadcasting signal to generate a product;
extracting a first DC-property signal corresponding to a frequency error of the carrier from the product of the multiplication;
storing the first DC-property signal, and selectively outputting one of the stored first DC-property signal and a second DC-property signal newly generated corresponding to another frequency error of the carrier according to whether the pilot of the I-signal is damaged; and
generating a complex carrier corresponding to the one of the first DC-property signal and the second DC-property signal.

13. The carrier recovery method of claim 12, wherein the selective outputting of the one of the first DC-property signal and the second DC-property signal comprises:
storing for a predetermined time the first DC-property signal and outputting the first DC-property signal;
receiving information about a pilot damage occurring due to a change in a channel environment;
selectively outputting of the one of the first DC-property signal and the second DC-property signal in accordance with the information about the pilot damage; and
in response to determining according to the information about the pilot damage that the pilot is damaged, counting a control time for the damaged pilot, and in response to the counted control time exceeding a reference time, outputting the second DC-property signal.

14. The carrier recovery method of claim 13, wherein the outputting of the one of the first DC-property signal and the second DC-property signal comprises:
outputting the first DC-property signal in response to determining according to the information about the pilot damage that the pilot is damaged; and
outputting the second DC-property signal in response to determining according to the information about the pilot damage that the pilot is not damaged.

15. A method of recovering a carrier of a Vestigial Sideband (VSB) broadcasting signal having an I-signal and a Q-signal in a VSB receiver, comprising:
generating a first DC-property signal indicating a first frequency error of a carrier of the VSB broadcasting signal in response to the I-signal and the Q-signal;
generating a second property signal indicating a second frequency error of the carrier of the VSB broadcasting signal in response to the I-signal and the Q-signal after the first DC-property signal has been generated;
generating information representing a pilot tone of a pilot of the VSB broadcasting signal;
selectively outputting one of the first DC-property signal and the second DC-property signal in response to the information;
generating a complex carrier in response to the one of the first DC-property signal and the second DC-property signal;
multiplying each of the I-signal and the Q-signal by the complex carrier; and
combining the multiplied I-signal and the multiplied Q-signal into the VSB broadcasting signal.

16. The method of claim 15, wherein the selectively outputting of the one of the first DC-property signal and the second DC-property signal comprises:
outputting the first DC-property signal when the information represents that the pilot tone is damaged.

17. The method of claim 15, wherein the selectively outputting of the one of the first DC-property signal and the second DC-property signal comprises:
outputting the second DC-property signal when the information represents that the pilot tone is not damaged.

18. The method of claim 15, wherein the generating of the first DC-property signal comprises:
storing the first DC-property signal in a memory before the second DC-property signal is generated.

19. The method of claim 18, wherein the selectively outputting of the one of the first DC-property signal and the second DC-property signal comprises:
outputting the stored first DC-property signal when the information represents that the pilot tone is damaged.

20. The method of claim 15, wherein the VSB receiver comprises a matching filter receiving the combined VSB broadcasting signal, detecting the pilot tone of the pilot of the carrier of the VSB broadcasting signal, and generating the information indicating the pilot tone, and the selectively outputting of the one of the first DC-property signal and the second DC-property signal comprises:
outputting the second DC-property signal when the information represents that the pilot tone is not damaged; and
outputting the first DC-property signal regardless of the second DC-property signal when the information represents that the pilot tone is damaged.

21. A carrier recovery apparatus of a Vestigial Sideband (VSB) broadcasting signal having an I-signal and a Q-signal, comprising:
a filter unit generating a first DC-property signal indicating a first frequency error of a carrier of the VSB broadcasting signal in response to the I-signal and the Q-signal, and generating a second DC-property signal indicating a second frequency error of the carrier of the VSB broadcasting signal in response to the I-signal and the Q-signal after the first DC-property signal has been generated;
a frequency error providing unit outputting the first DC-property signal instead of the second DC-property in response to information representing that a pilot tone of a pilot of the VSB broadcasting signal is damaged; and
a numerically-controlled oscillator generating a complex carrier corresponding to the first DC-property signal;
a multiplier multiplying each of the I-signal and the Q-signal by the complex carrier to generate a product; and a matched filter combining the multiplied I-signal and the multiplied Q-signal into the VSB broadcasting signal in response to the product of the multiplier and generating the information from the combined VSB broadcasting signal.

22. The carrier recovery apparatus of claim 21, wherein the frequency error providing unit stores the first DC-property signal in a memory when the filter unit generates the second DC-property signal.

23. The carrier recovery apparatus of claim 22, wherein the frequency error providing unit outputs the stored first DC-property signal regardless of the second DC-property signal when the pilot tone of the pilot of the VSB broadcasting signal is damaged.

24. The carrier recovery apparatus of claim 22, wherein the frequency error providing unit outputs the second DC-property signal when the pilot tone of the pilot of the VSB broadcasting signal is not damaged.

25. The carrier recovery apparatus of claim 22, wherein the filter unit comprises:
   a first low pass filter generating a size of a carrier of the VSB broadcasting signal;
   a limiter limiting the size of the carrier;
   a second multiplier multiplying the limited size of the carrier by the Q-signal to generate a second product; and
   a second LPF extracting the first DC-property signal and the second DC-property signal corresponding to a frequency error of the carrier from the second product from the second multiplier.

26. The carrier recovery apparatus of claim 22, wherein the frequency error providing unit comprises:
   a register storing the first DC-property signal for a predetermined time;
   a switching unit receiving the stored first DC-property signal from the register and the second DC-property signal from the filter unit; and
   a mode control unit controlling the switching unit to output one of the stored first DC-property signal from the register and the second DC-property signal from the filter unit in accordance with the received information.

27. The carrier recovery apparatus of claim 22, wherein the control unit comprises:
   a counting unit counting a control time when the information represents that the pilot tone is damaged, and providing the mode control unit with time-over information when the counted control time exceeds a reference time, wherein the mode control unit controls the switching unit to output the second DC-property signal from the second LPF in accordance with the time-over information.

28. The carrier recovery apparatus of claim 27, wherein the mode control unit controls the switching unit to output the first DC-property signal when the counted control time does not exceed the reference time.

29. A Vestigial Sideband (VSB) broadcasting signal receiver, comprising:
   an analog-to-digital converter (ADC) converting an analog VSB broadcasting signal into a digital signal;
   an I/Q splitter shifting the digital signal to a baseband signal and splitting the baseband signal into an I-signal and a Q-signal constituting a VSB broadcasting signal;
   a symbol timing recovery (STR) unit detecting a sampling timing error of the VSB broadcasting signal with respect to I-signal and Q-signal, respectively;
   an interpolator compensating for a sampling offset of the I-signal and the Q-signal in accordance with the sampling timing error detected by the STR unit;
   a carrier recovery unit generating the complex carrier based on a DC-property signal which was previously input and stored therein when a pilot included in the I-signal is damaged;
   a multiplier multiplying each of the I-signal and the Q-signal by the complex carrier to recover a carrier of the VSB broadcasting signal based on the complex carrier to generate a product;
   a matched filter generating the VSB broadcasting signal by combining the I-signal and the Q-signal in response to the product of the multiplier; and
   an equalizer compensating for a distortion of the VSB broadcasting signal occurring in a transmitting channel with respect to the VSB broadcasting signal from the matched filter.

* * * * *